US012676370B2

(12) United States Patent
Roy et al.

(10) Patent No.: US 12,676,370 B2
(45) Date of Patent: Jul. 7, 2026

(54) ELASTOMERIC GASKET CONTACTING THE INNER SURFACE OF THE CASING LID OF A PULSE DISCHARGEABLE LITHIUM ELECTROCHEMICAL CELL

(71) Applicant: GREATBATCH LTD., Clarence, NY (US)

(72) Inventors: Mark J. Roy, Buffalo, NY (US); Jordan A. Hartwig, East Aurora, NY (US)

(73) Assignee: Greatbatch Ltd., Clarence, NY (US)

( * ) Notice: Subject to any disclaimer, the term of this patent is extended or adjusted under 35 U.S.C. 154(b) by 584 days.

(21) Appl. No.: 18/214,668

(22) Filed: Jun. 27, 2023

(65) Prior Publication Data

US 2024/0021934 A1     Jan. 18, 2024

Related U.S. Application Data

(60) Provisional application No. 63/389,408, filed on Jul. 15, 2022.

(51) Int. Cl.
H01M 50/193          (2021.01)
H01M 4/54             (2006.01)
          (Continued)

(52) U.S. Cl.
CPC ........... H01M 50/193 (2021.01); H01M 4/54 (2013.01); H01M 50/15 (2021.01);
          (Continued)

(58) Field of Classification Search
CPC ...... H01M 50/193; H01M 4/54; H01M 50/15; H01M 50/188; H01M 50/191; H01M 2004/027
See application file for complete search history.

(56) References Cited

U.S. PATENT DOCUMENTS 4,310,609 A     1/1982     Liang et al.
4,391,729 A     7/1983     Liang et al.
          (Continued)

FOREIGN PATENT DOCUMENTS

EP          0391720 B1     6/1995
EP          1914818 A1     4/2008

OTHER PUBLICATIONS

Takeuchi , et al., "Lithium Deposition in Prismatic Lithium Cells During Intermittent Discharge", J. Electrochem. Soc., vol. 138, No. 9, Sep. 1991, Sep. 1, 1991, L44-L45.
          (Continued)

*Primary Examiner* — James M Erwin
*Assistant Examiner* — Sarah Arimintia Applegate
(74) *Attorney, Agent, or Firm* — Michael F. Scalise

(57)          ABSTRACT

A pulse dischargeable electrochemical cell, preferably of a Li/SVO couple, is described. To help prevent lithium clusters from bridging to the terminal pin extending below the casing lid and connected to the cathode current collector tab, an elastomeric gasket directly contacts the inner surface of the lid. The elastomeric gasket is preferably a unitary member comprising an O-ring gasket portion that contacts the sealing glass of the glass-to-metal seal (GTMS), and a sheet-shaped gasket portion connected to the O-ring gasket portion and that contacts the inner surface of the lid. The GTMS does not have a ferrule. Instead, the sealing glass seals directly to the lid and to the terminal pin. The elastomeric gasket resides between the lid and an insulator compartment, which is described in co-assigned U.S. Pat. No. 10,629,862 to Roy et al.

18 Claims, 6 Drawing Sheets

(51) Int. Cl.
  *H01M 50/15*            (2021.01)
  *H01M 50/188*           (2021.01)
  *H01M 50/191*           (2021.01)
  *H01M 4/02*             (2006.01)

(52) U.S. Cl.
  CPC ....... *H01M 50/188* (2021.01); *H01M 50/191*
          (2021.01); *H01M 2004/027* (2013.01)

(56)                    References Cited

U.S. PATENT DOCUMENTS

| | | | |
|---|---|---|---|
| 5,776,632 A * | 7/1998 | Honegger ........... | H01M 50/627 |
| | | | 429/185 |
| 6,551,747 B1 | 4/2003 | Gan | |
| 6,610,443 B2 | 8/2003 | Paulot et al. | |
| 6,933,074 B2 | 8/2005 | Hallifax et al. | |
| 7,482,093 B1 | 1/2009 | Freitag et al. | |
| 10,205,151 B2 | 2/2019 | Dai et al. | |
| 10,224,518 B2 | 3/2019 | Freitag et al. | |
| 10,629,862 B2 | 4/2020 | Roy et al. | |
| 11,114,661 B2 | 9/2021 | Talamine et al. | |
| 2007/0117021 A1 | 5/2007 | Frustaci et al. | |
| 2018/0130978 A1 | 5/2018 | Roy et al. | |
| 2019/0296281 A1* | 9/2019 | Elsberry ............ | H01M 10/657 |

OTHER PUBLICATIONS

Extended European Search Report, Application No. 23185428.2, dated Dec. 18, 2023.

* cited by examiner

ELASTOMERIC GASKET CONTACTING THE INNER SURFACE OF THE CASING LID OF A PULSE DISCHARGEABLE LITHIUM ELECTROCHEMICAL CELL

CROSS-REFERENCE TO RELATED APPLICATION

This application claims priority to U.S. provisional application Ser. No. 63/389,408, filed on Jul. 15, 2022.

BACKGROUND OF THE INVENTION

1. Field of the Invention

The present disclosure relates generally to the conversion of chemical energy to electrical energy. In particular, the present disclosure is directed to a pulse dischargeable primary lithium electrochemical cell that is designed to power an implantable medical device, such as a cardiac defibrillator, without premature cell discharge caused by lithium clusters bridging from any negative polarity portion to a positive polarity portion. Lithium/silver vanadium oxide and lithium coupled with a cathode comprising SVO/current collector/$CF_x$ are two preferred electrochemical systems among many.

BACKGROUND OF THE INVENTION

The present invention is directed to an insulator gasket that covers a portion of the inner surface of a casing lid around the glass-to-metal seal (GTMS) to thereby form a physical barrier isolating the terminal pin from contact with lithium clusters in the vicinity of the GTMS. In conjunction with an insulator compartment of the type described in U.S. Pat. No. 10,629,862 to Roy et al., the electrode assembly including all of the positive polarity portions are physically segregated from the negative terminal comprising the anode leads connected to the casing in a primary lithium electrochemical cell. This degree of isolation is necessary to prevent lithium clusters from bridging between the positive and negative portions of the cell. Lithium clusters are the result of a higher $Li^+$ ion concentration in the electrolyte immediately adjacent to an anodic polarity surface, creating an anodically polarized region which could result in reduction of lithium ions onto the anodic surface as the concentration gradient relaxes. Typically, a lithium-ion concentration gradient is induced by a high-rate intermittent pulse discharge of a lithium/silver vanadium oxide (Li/SVO) cell, or a lithium anode coupled with a cathode comprising SVO/current collector/$CF_x$, as described in U.S. Pat. No. 6,551,747 to Gan, which is assigned to the assignee of the present invention and incorporated herein by reference. Should lithium cluster bridging occur, it could result in an internal loading mechanism that could prematurely discharge the cell.

2. Prior Art

The mechanism controlling lithium deposition on the anode lead and casing of a case negative primary lithium electrochemical call is described in the publication by Takeuchi, E. S.; Thiebolt, W. C. J. Electrochem. Soc. 138, L44-L45 (1991). While this publication specifically discusses measurements made on the Li/SVO system, it is noted that they also apply to other solid insertion type cathodes used in lithium cells where voltage decreases with discharge.

According to the investigators, lithium deposition is induced by high-rate intermittent discharge of a lithium/silver vanadium oxide cell, which can form "lithium clusters" bridging between the negative case and the positive connections to the cathode. This conductive bridge can then result in an internal loading mechanism that prematurely discharges the cell.

The mechanism for lithium cluster formation is as follows: at equilibrium, the potential of the lithium anode is governed by the concentration of lithium ions in the electrolyte according to the Nernst equation. If the $Li^+$ ion concentration is increased over a limited portion of the anode surface, then the anode/electrolyte interface in this region is polarized anodically with respect to the anode/electrolyte interface over the remaining portion of the anode. Lithium ions will be reduced in this region of higher concentration and lithium metal will be oxidized over the remaining portion of the anode until the concentration gradient is relaxed. The concentration gradient may also be relaxed by diffusion of lithium ions from the region of higher concentration to lower concentration. However, as long as a concentration gradient exists, deposition of lithium is thermodynamically favored in the region of higher lithium-ion concentration.

In Li/SVO electrochemical cells, $Li^+$ ions are discharged at the anode and subsequently intercalated into the cathode. The anode and cathode are placed in close proximity across a thin separator. Immediately after a pulse discharge, the $Li^+$ ion concentration gradient in the separator is dissipated as the $Li^+$ ions diffuse the short distance from the anode to the cathode and then within the pore structure of the cathode. However, at the electrode assembly edge, the anode edge is not directly opposed by a cathode edge. If excess electrolyte pools at this unopposed anode edge, $Li^+$ ions, which are discharged into the electrolyte pool, have a longer distance to diffuse to the cathode than $Li^+$ ions discharged into the separator. Consequently, this electrolyte pool maintains a higher concentration of $Li^+$ ions for a longer period of time after a pulse discharge.

Typically, the lithium anode tab extending from the anode current collector is welded to the inside of the cell casing. Therefore, if these anodic components are also wetted by excess electrolyte, this $Li^+$ ion concentration gradient extends over the anode tab where it is connected to the casing, and lithium cluster deposition is induced onto these surfaces by the Nernstian anodic potential shift derived from the higher $Li^+$ ion concentration in the excess electrolyte pool after a pulse discharge.

Greatbatch Ltd., Clarence, New York, is the assignee of several inventions that are directed to physically isolating the negative polarity inactive components from the positive polarity inactive components inside the cell casing. These inventions are designed to prevent lithium clusters from bridging from any negative polarity portion to a positive polarity portion inside the casing.

One such invention is described in U.S. Pat. No. 10,629,862 to Roy et al., which is incorporated herein by reference. The '862 patent to Roy et al. relates to a primary lithium electrochemical cell having an insulator compartment that comprises mating first and second clamshell-shaped insulator members positioned underneath the inner surface of the lid. The first insulator member comprises a first major face wall that is positioned adjacent to an inner surface of the lid and connected to a first surrounding sidewall extending away from the lid toward the perimeter edge of the electrode assembly including the cathode current collector. The second insulator member has a second major face wall that is positioned adjacent to the perimeter edge of the electrode assembly and connected to a second surrounding sidewall extending toward the lid. The first and second clamshell-shaped insulator members are mated to each other with the facing first and second surrounding sidewalls being in an overlapping, direct contact relationship to form the insulator compartment residing between the lid and the perimeter edge of the electrode assembly.

The first major face wall of the first insulator member has a depending boss with a first opening. The ferrule of the glass-to-metal seal (GTMS) is received in the boss with the terminal pin extending through the first opening into the interior of the casing. The cathode tab extends through a second opening in the second major face wall of the second insulator member. Then, the terminal pin is connected to the cathode tab inside the insulator compartment to substantially envelope the terminal pin connected to the cathode tab to help prevent lithium clusters from bridging from the negative polarity anode to the cathode connection components.

While the insulator compartment described by the '862 patent to Roy et al. works well to prevent lithium clusters from bridging between the anode and its negative polarity anode current collector tab connected to the casing to the opposite polarity terminal pin connected to the cathode current collector tab, it is particularly useful when the terminal pin is supported in the lid by a GTMS that includes a ferrule welded into an opening in the lid.

However, one feature of the lithium electrochemical cell of the present invention is that the GTMS does not have a ferrule. Instead, the sealing glass directly hermetically contacts the lid at the perimeter of the lid opening and directly hermetically contacts the terminal pin to electrically isolate the terminal pin from the lid and the container comprising the casing. In this type of GTMS construction, if the first major face wall of the first clamshell-shaped insulator member described by the '862 patent to Roy et al. is not positioned tightly against the inner surface of the lid, there can be a very small gap that could be wide enough for a lithium cluster to form and contact the terminal pin. Moreover, since the lid is made of a metal material, for example, titanium and the insulator compartment is made from a polymeric material, it is not always possible to get a tight seal between the metal lid and polymeric insulator compartment.

U.S. Pat. Nos. 6,933,074 and 7,482,093, both to Frustaci et al., which are also assigned to the assignee of the present invention and incorporated herein by reference, describe various other structures for preventing lithium clusters from bridging from the anode to the positive polarity components inside the cell casing.

While the prior art designs described in the '074, '093 and '862 patents provide adequate protection against lithium clusters from bridging between the anode and the terminal pin connected to the cathode current collector tab, there is a desire to provide additional protection against lithium clusters bridging in this area. That is particularly the case in the relatively small gap between the polymeric insulator compartment described by the '862 patent to Roy et al. and the inner surface of the casing lid. Since these components are made from dissimilar materials, it is not always possible to get a tight, gap-less fit between them.

SUMMARY OF THE INVENTION

The present invention is, therefore, directed to an electrochemical cell including a casing comprising a container having a sidewall extending from a closed bottom wall to an open end. A lid closing the open end of the container has spaced-apart inner and outer surfaces extending to a peripheral edge. The lid also has a terminal pin opening and an electrolyte fill port. A terminal pin extends through the terminal pin opening. A glass-to-metal seal (GTMS) comprises a sealing glass having an inner meniscus that is recessed distally from the inner surface of the lid. The sealing glass electrically isolates the terminal pin from the lid so that the terminal pin is in a non-conductive relation with the casing. Moreover, the GTMS does not include a ferrule. Instead, the sealing glass seals directly to the lid in the terminal pin opening and to the terminal pin.

An exemplary electrode assembly housed inside the casing has lithium supported on an anode current collector. At least one anode lead extending from the anode current collector is connected to the casing in a case-negative design. The cathode preferably comprises silver vanadium oxide (SVO) supported on a cathode current collector, or a cathode current collector with SVO and $CF_x$ contacted to the opposed major surfaces of the cathode current collector. A cathode tab extending outwardly from the cathode current collector is connected to the terminal pin adjacent to the lid. A separator is positioned between the anode and the cathode to prevent direct physical contact between the opposite polarity electrodes, and an electrolyte in the casing activates the electrode assembly. While silver vanadium oxide is preferred, the present invention is also useful with other cathode active materials that are coupled to a lithium anode.

To help prevent lithium clusters from bridging to the terminal pin extending below the casing lid and connected to the cathode current collector tab, an elastomeric gasket directly contacts the inner surface of the lid. The elastomeric gasket comprises an O-ring gasket portion that contacts the sealing glass of the GTMS, and a sheet-shaped gasket portion connected to the O-ring gasket portion and that contacts the inner surface of the lid.

Another feature of the electrochemical cell is that the peripheral edge of the lid has spaced apart upper and lower side edge portions meeting right and left end edge portions. The sheet-shaped portion of the elastomeric gasket extends to the upper and lower side edge portions but is spaced from the right and left end edge portions of the lid. That provides uncovered portions of the inner lid surface that are where lithium clusters can contact the lid without bridging to a positive polarity cathode component. While it is virtually impossible to prevent lithium cluster formation is a pulse discharging lithium electrochemical cell, should the lithium clusters contact those uncovered portion of the inner lid surface, they are at a sufficient distance from the cathode current collector tab connected to the terminal pin inside the casing to not result in an internal loading mechanism that could prematurely discharge the cell.

Some embodiments of an electrochemical cell according to the present invention also include an insulator compartment that is positioned between the insulator gasket and an upper edge of the electrode assembly. The insulator compartment has a first insulator member comprising a first surrounding sidewall extending from a first major face wall to a first outer edge. The first major face wall is disposed adjacent to the insulator gasket with the first surrounding sidewall extending away from the lid toward the upper edge of the electrode assembly including the upper edge of the cathode current collector. The terminal pin extends through a first opening in the first major face wall.

A second insulator member has a second surrounding sidewall extending from a second major face wall to a second outer edge. The second major face wall is positioned adjacent to the upper perimeter edge of the electrode assembly including the upper edge of the cathode current collector. The second surrounding sidewall extends away from the electrode assembly toward the lid with the cathode tab extending through a second opening in the second major face wall of the second insulator member.

The first and second insulator members are mated to each other with one of the first and second outer edges of the first and second surrounding sidewalls facing the other of the first and second major face walls so that at least a portion of the first surrounding sidewall is in an overlapping, direct contact relationship with at least a portion of the second surrounding sidewall to thereby form the insulator compartment residing between the upper perimeter edge of the electrode assembly and the lid. In that manner, the insulator compartment contacting the insulator gasket in turn contacting the inner surface of the lid provides a barrier that prevents lithium clusters from bridging between the anode and the positive polarity cathode connections inside the casing.

These and other aspects of the present invention will become more apparent to those skilled in the art by reference to the following description and to the appended drawings.

DETAILED DESCRIPTION OF THE PREFERRED EMBODIMENTS

Figure 1:
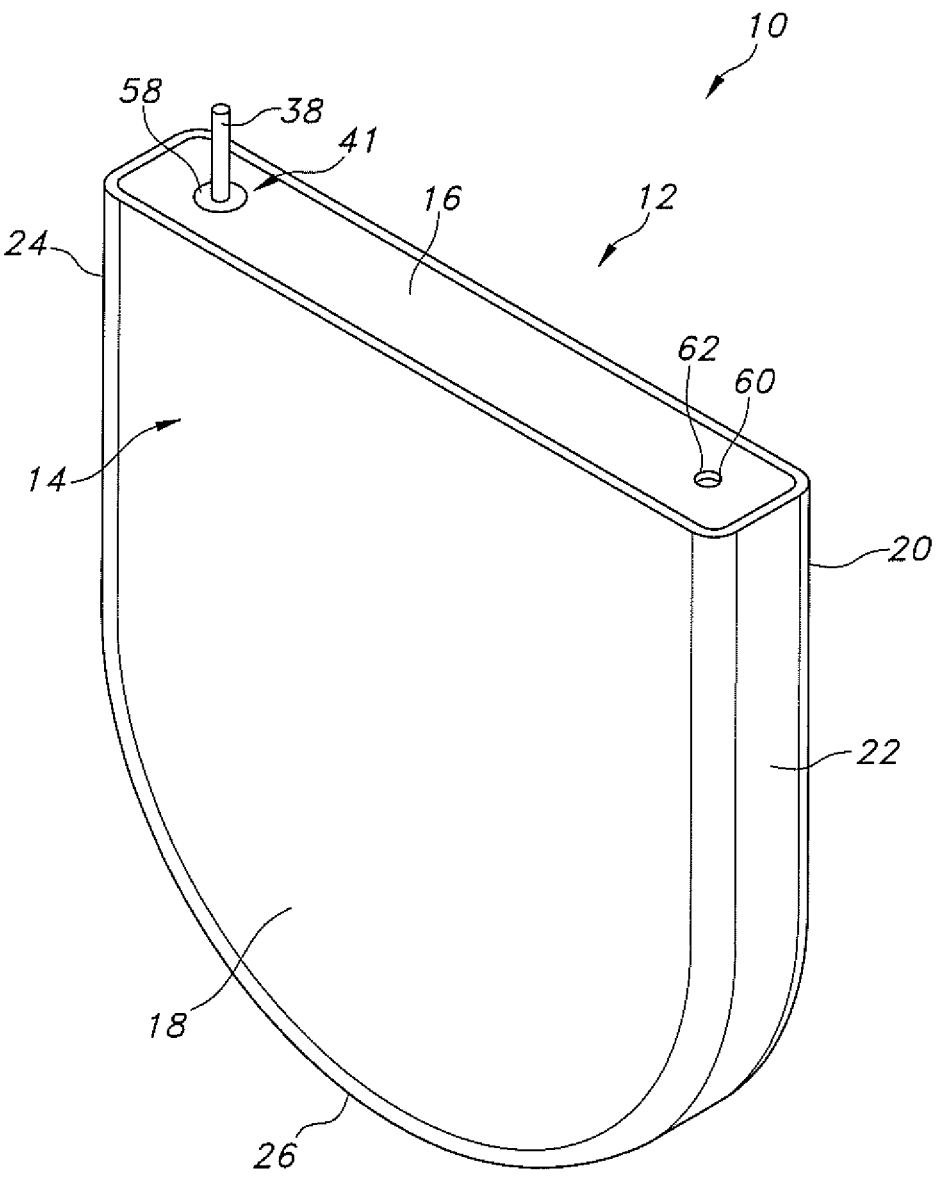
FIG. 1 is a perspective view of an exemplary electrochemical cell 10 according to the present invention.

Referring now to the drawings, FIG. 1 is a perspective view of an exemplary electrochemical cell 10 according to the present invention. The electrochemical cell 10 includes a casing 12 comprising an open-ended container 14 closed by a lid 16. The exemplary open-ended container 14 has spaced-apart front and back sidewalls 18 and 20 joined to curved end walls 22 and 24 and a curved bottom wall 26. The container and lid 14, 16 are comprised of a biocompatible conductive material, for example, titanium.

Figure 2:
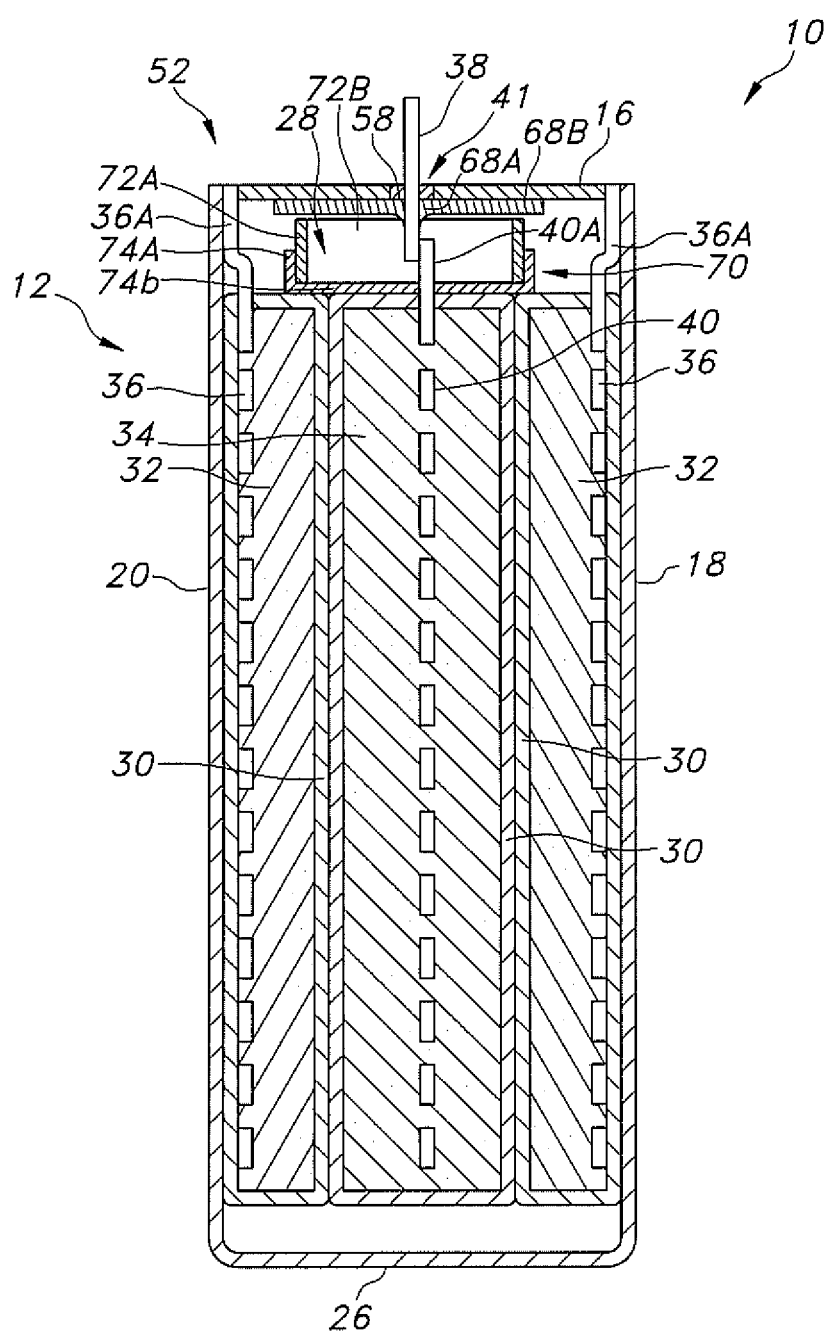
FIG. 2 is a cross-sectional view illustrating an exemplary electrode assembly 28 for the electrochemical cell 10 shown in FIG. 1.

As shown in FIG. 2, before the lid 16 is secured to the open end of the container 14 to provide the casing 12, an electrode assembly 28 is housed inside the container. The electrode assembly 28 comprises a separator 30 that is positioned between at least one anode 32 in electrochemical association with at least one cathode 34. In the embodiment shown in FIG. 2, the anode 32 is positioned between opposed cathodes 34. The intermediate separator 30 prevents the anode 32 from directly contacting the cathode 34 while allowing ionic flow therethrough to support electrochemical discharge of the cell 10.

The exemplary electrochemical cell 10 shown in FIG. 2 is built in a case-negative configuration with the anode 32 electrically connected to the container and lid 14, 16 via an anode tab 36A extending outwardly from an anode current collector 36 while the cathode 34 is electrically connected to a terminal pin 38 via a cathode tab 40A extending outwardly from a cathode current collector 40. The terminal pin 38 is electrically isolated from the container and lid 14, 16 by a glass-to-metal seal 41, which will be described in greater detail hereinafter. Both the anode and cathode current collectors 36, 40 are composed of an electrically conductive material, for example, nickel or aluminum. Molybdenum is a suitable material for the terminal pin 38.

Alternatively, a case-positive cell design may be constructed by reversing the electrical connections. In other words, terminal pin 38 is connected to the anode 32 via the anode tab 36A extending from the anode current collector 36 and the cathode 34 is electrically connected to the container and lid 14, 16 via the cathode tab 40A extending from the cathode current collector 40.

Figures 4, 5, 6:
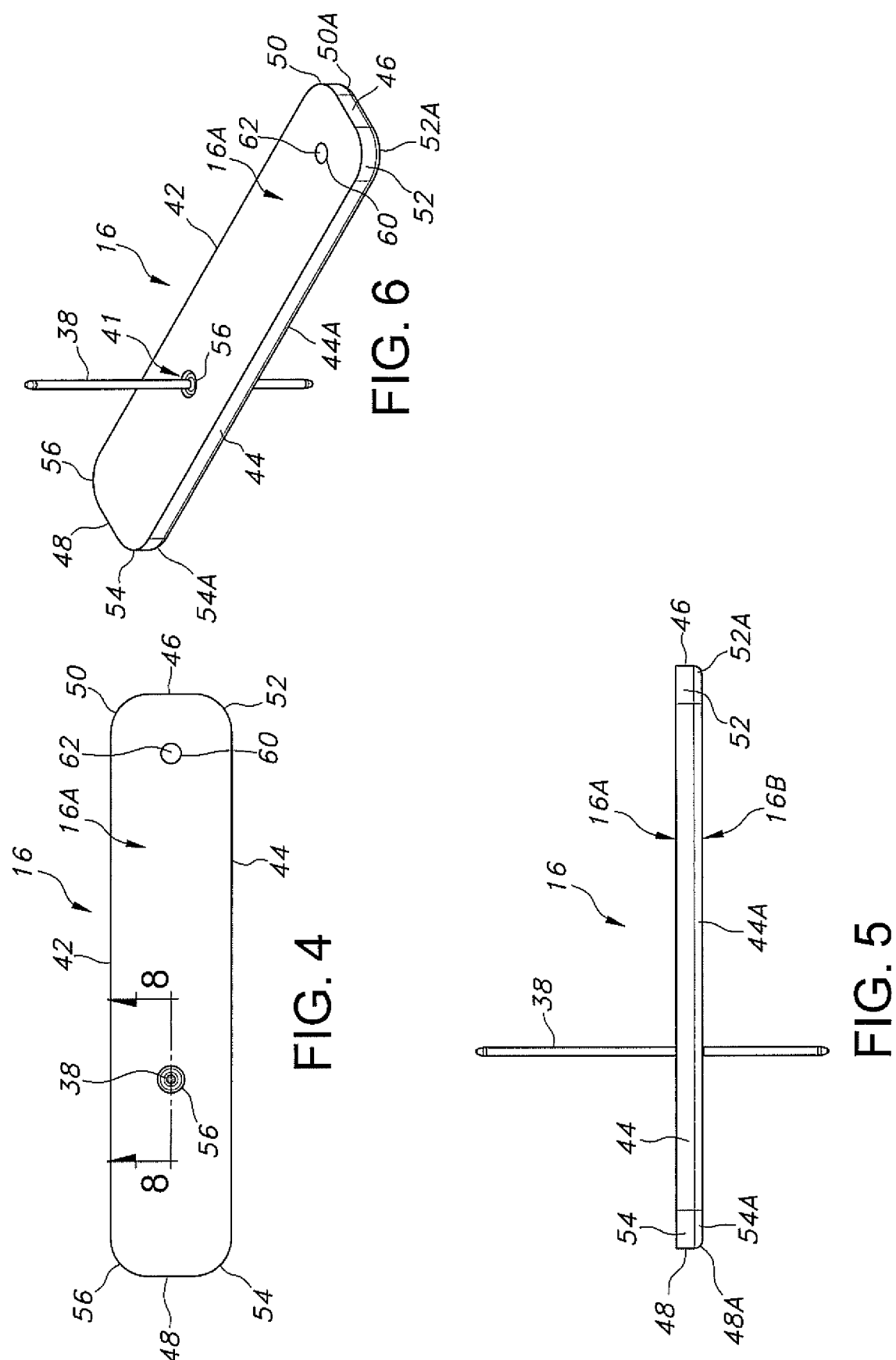
FIG. 4 is a plan view looking at the outer surface 16A of the lid 16 for the electrochemical cells 10, 10A shown in respective FIGS. 2 and 3.
FIG. 5 is a side elevational view looking at the lower side edge portion 44 of the lid 16 shown in FIG. 3.
FIG. 6 is a perspective view of the lid 16 shown in FIGS. 4 and 5.

With respect to the orientation of the lid 16 shown in FIGS. 4 to 6, the lid 16 has a peripheral edge comprising spaced apart upper and lower side edge portions 42 and 44 extending to opposed right and left end edge portions 46 and 48. There are curved corners where the side edge portions meet the end edge portions. In particular, side edge portion 42 meets end edge portion 46 at curved corner 50, end edge portion 46 meets side edge portion 44 at curved corner 52, side edge portion 44 meets end edge portion 48 at curved corner 54 and end edge portion 48 meets side edge portion 42 at curved corner 56. The side edge portions 42, 44 and the end edge portions 46, 48 and the included curved corners 50, 52, 54 and 56 extend to and meet with the outer lid surface 16A spaced from the inner lid surface 16B. Preferably the outer and inner lid surfaces 16A and 16B are planar and aligned parallel to each other.

As further shown in FIGS. 5 and 6, the side edge portions 42, 44, the end edge portions 46, 48 and the included curved corners 50, 52, 54 and 56 meet the outer lid surface 16A at right angles. However, side edge portion 42 meets the inner lid surface 16B at a rounded border 42A, curved corner 50 meets the inner lid surface 16B at rounded border 50A, end edge portion 46 meets the inner lid surface 16B at rounded border 46A, curved corner 52 meets the inner lid surface 16B at rounded border 52A, side edge portion 44 meets the inner lid surface 16B at rounded border 44A, curved corner 54 meets the inner lid surface 16B at rounded border 54A, end edge portion 48 meets the inner lid surface 16B at rounded border 48A, and curved corner 56 meets the inner lid surface 16B at rounded border 56A.

Once the electrode assembly 28 is appropriately positioned inside the container 14, the lid 16 is fitted over the open end thereof. In a preferred embodiment, the perimeter edge of the lid 16 is positioned within an interior perimeter of the surrounding walls 18, 20, 22 and 24 forming the open-ended container 14. Alternatively, the lid 16 may be positioned with its inner surface 16B contacting an upper edge of the surrounding walls 18, 20, 22 and 24. In any event, the lid 16 is preferably welded to the open end of the container 14, preferably by a laser weld (not shown), to close the container and thereby provide the casing 12. Alternatively, other joining methods such as resistance welding, arc welding, magnetic pulse welding, or soldering may be used to join the lid 16 to the open-ended container 14. It will be apparent to those skilled in the art that conventional welding parameters may be used in joining the two parts 14, 16 together.

FIGS. 4 to 8 further illustrate that the GTMS 41 comprises an opening 56 that extends through the thickness of the lid 16 from its outer surface 16A to the lid inner surface 16B. In that respect, an important aspect of the present electrochemical cell 10 is that the GTMS 41 does not have a ferrule. Instead, the sealing glass 58 directly hermetically contacts the lid 16 at the perimeter of the opening 56 and directly hermetically contacts the terminal pin 38 to electrically isolate the terminal pin from the lid 16 and container 14 comprising the casing 12. Suitable sealing glasses for this purpose include, but are not limited to, Ferro IP510, Corning 1890, Schott 8422, and Schott 8629. In a case-negative cell design, the terminal pin 38 is connected to the cathode tab 40A and the cathode current collector 40 for the cathode 34.

The lid 16 also has a second opening 60 extending through its thickness. This opening 60 serves as an electrolyte fill port for filling the casing 12 with an electrolyte (not shown) after the electrode assembly 28 is housed in the container 14 and the open end of the container is closed by the lid 16. In its fully assembled condition shown in FIG. 1, a closure means 62 is hermetically sealed in the electrolyte fill port 60 to close the casing 12.

Figure 8:
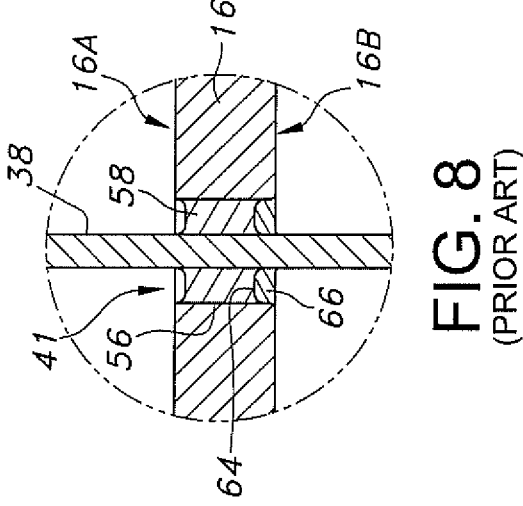
FIG. 8 is a cross-sectional view taken along line 8-8 of FIG. 4 showing the GTMS 41 comprising a sealing glass 58 residing in a lid opening 56 and sealing directly to the lid 16 and a terminal pin 38 with an elastomeric O-ring 60 covering an inner surface of the glass 58 according to the prior art.
Figure 7:
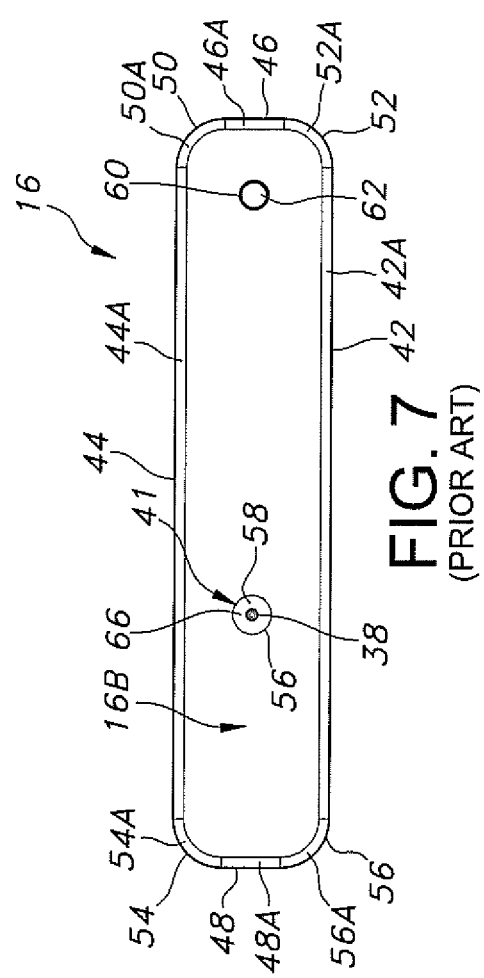
FIG. 7 is a plan view looking at the inner surface 16B of the lid 16 with an elastomeric O-ring 66 covering the inner meniscus 64 of the glass-to-metal seal (GTMS) 41 according to the prior art.
Figures 9, 10, 11, 12:
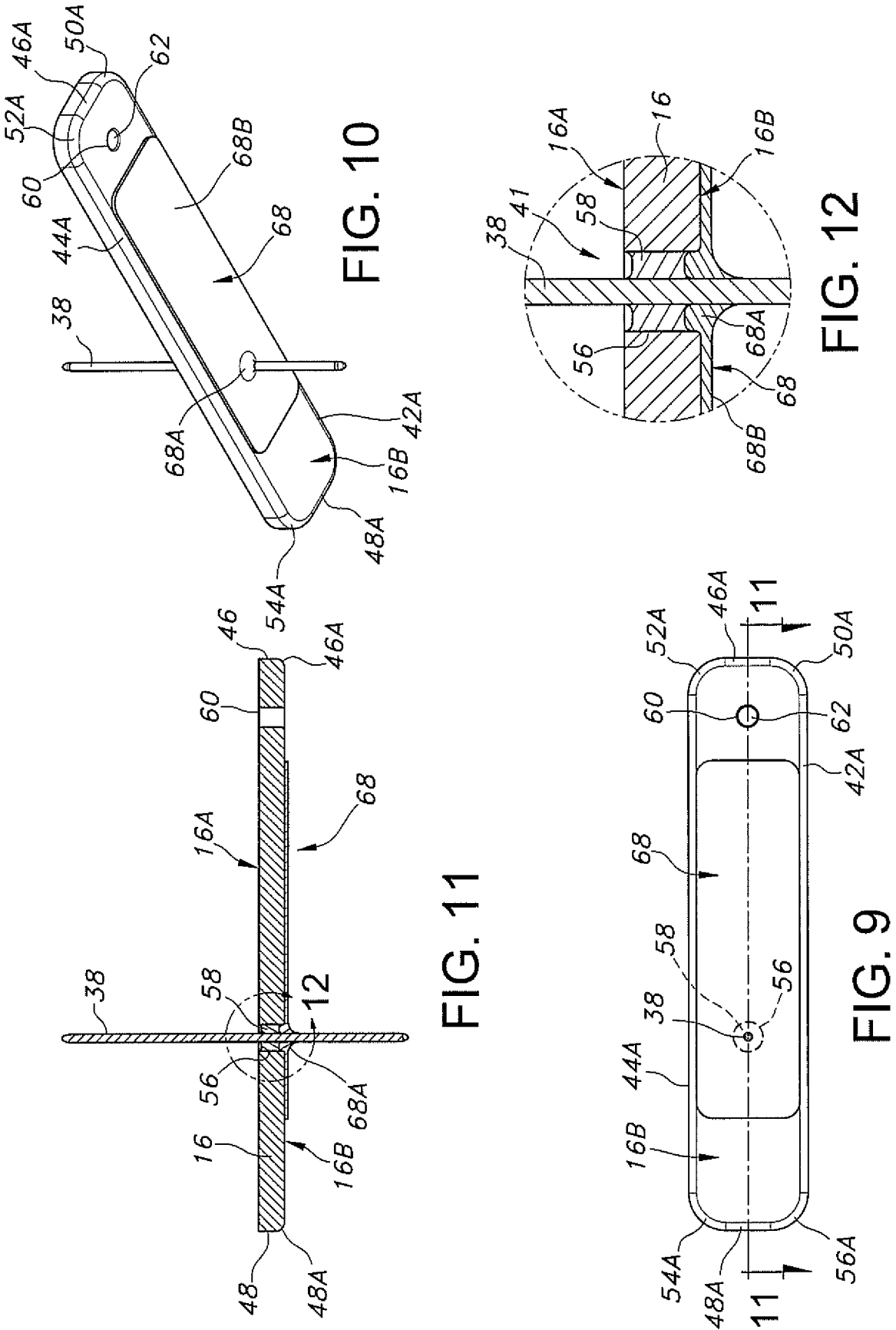
FIG. 9 is a plan view showing a unitary elastomeric insulator gasket 68 according to the present invention covering the inner surface 16B of the lid 16 including the sealing glass 58 residing in the lid opening 56 and sealing directly to the lid 16 and the terminal pin 38.
FIG. 10 is a perspective view of the unitary elastomeric insulator gasket 68 of the present invention shown in FIG. 9 covering the inner surface 16B of the lid 16.
FIG. 11 is a cross-sectional view taken along line 11-11 of FIG. 9.
FIG. 12 is an enlarged view of the indicated section of FIG. 11 showing the unitary elastomeric gasket 68 of the present invention covering the inner surface 16B of the lid 16 and the sealing glass 58 for the GTMS 41.

As shown in FIGS. 8 and 12, the sealing glass 58 has an inner meniscus 64 opposite an outer meniscus. The inner meniscus 64 is recessed distally from the inner surface 16B of the lid 16. In the conventional or prior art design for the GTMS 41 shown in FIG. 8, an elastomeric O-ring 66 covers the inner meniscus 64 and extends to the inner surface 16B of the lid 16.

In contrast, according to the present invention shown in FIGS. 9 to 12, a unitary elastomeric gasket 68 covers and directly contacts the inner surface 16B of the lid 16. The elastomeric gasket 68 makes a fluid-tight seal against the inner lid surface 16B and comprises an O-ring portion 68A and a planar sheet-shaped portion 68B. In particular, the O-ring portion 68A seals directly against the curved surface of the inner meniscus 64 of the sealing glass 58 in a similar manner as the prior art elastomeric O-ring 66 shown in FIG. 8. The O-ring portion 68A of the unitary elastomeric gasket 68 is continuous with the planar sheet-shaped portion 68B. The sheet-shaped portion 68B has a width that extends from the rounded border 42A of the upper side edge portion 42 to the rounded border 44A of the lower side edge portion 44 of the lid 16, and a length that extends along the inner lid surface 16B from adjacent to the electrolyte fill port 60 to adjacent to the rounded border 48A of the left end edge portion 48.

Figure 3:
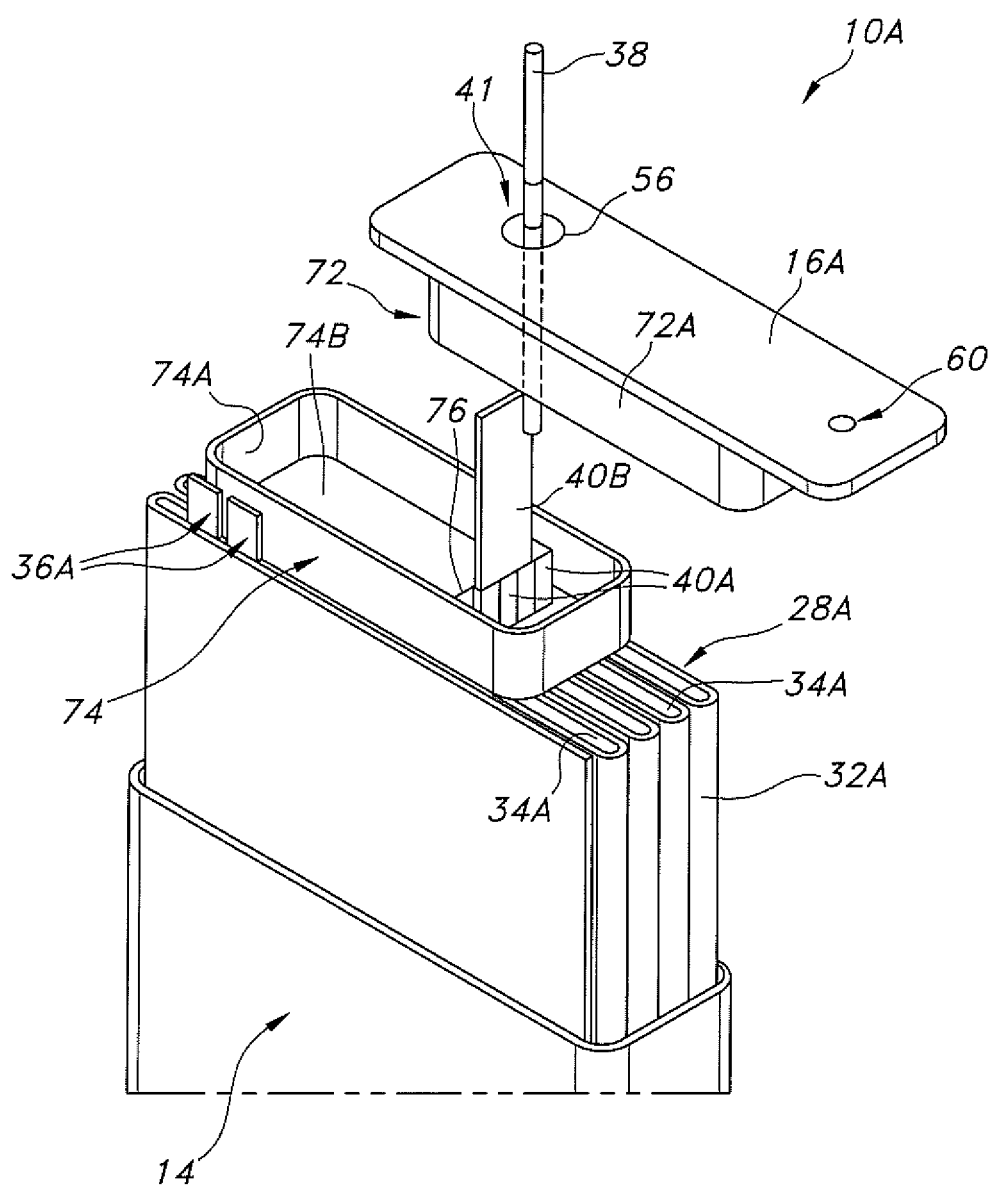
FIG. 3 illustrates a perspective view of another exemplary electrode assembly 28A for an electrochemical cell 10A according to the present invention.

Turning now to FIG. 3, another exemplary embodiment of an electrochemical cell 10A according to the present invention is illustrated. Electrochemical cell 10A has an electrode assembly 28A comprising an elongate anode 32A that is folded into a serpentine configuration. Then, a plurality of individual cathode plates 34A are positioned inside the anode folds. A separator (not shown) prevents the serpentine anode 32A from direct physical contact with the plurality of cathode plates 34A. Anode current collector tabs 36A extend outwardly from an anode current collector (not shown) for the serpentine anode 34. Further, a plurality of cathode tabs 40A extend outwardly from individual cathode current collectors (not shown) for the plurality of cathode plates 34A. The cathode tabs 40 are then connected to a manifold 40B that in turn is connected to the terminal pin 38. An exemplary electrochemical cell having a plurality of current collector tabs connected to a common manifold is shown in U.S. Pat. No. 11,114,661 to Talamine et al., which is assigned to the assignee of the present invention and incorporated herein by reference.

To further help prevent lithium clusters from bridging between the anode 32 and the positive polarity components for the cells 10 and 10A, an insulator compartment 70 (FIGS. 2 and 3) resides between an upper edge of the electrode assemblies 28, 28A, in particular between an upper edge of the cathode 34 shown in FIG. 2 and the plurality of cathode plates 34A shown in FIG. 3, and the casing 12, in particular the lid 16. The insulator compartment 70 is constructed from a first clamshell-shaped insulator member 72 that is mated to a second clamshell-shaped insulator member 74.

The first clamshell-shaped insulator member 72 has a first surrounding sidewall 72A meeting a first major face wall 72B. The first major face wall 72B is contacted to the planar sheet-shaped portion 68B of the unitary elastomeric gasket 68 which, in turn, is contacted to the inner surface 16B of the lid 16 with the first surrounding sidewall 72A extending towards the electrode assemblies 28, 28A including the cathode 34, 34A. The first major face wall 72B has a first opening (not shown) through which the terminal pin 38 extends.

The second clamshell-shaped insulator member 74 has a second surrounding sidewall 74A meeting a second major face wall 74B. The second major face wall 74B is disposed adjacent to the upper edge of the electrode assemblies 28, 28A with the second surrounding sidewall 74A extending towards the lid 16. The second major face wall 74B has a second opening or window 76 for receiving the at least one cathode tab 40A of the electrochemical cell 10 shown in FIG. 2 and the plurality of cathode tabs 40A of the electrochemical cell 10A shown in FIG. 3, and other cathodic components, for example the bridge 40B (FIG. 3) as a particular cell design requires. To provide the insulator compartment 70, the first and second clamshell-shaped insulator members 72, 74 are mated to each other with an outer edge of one of the first and second surrounding sidewalls 72A, 74A facing the other of the first and second major face walls 72B, 74B and with at least a portion of the first surrounding sidewall 72A being in an overlapping, direct contact relationship with at least a portion of the second surrounding sidewall 74A.

The insulator compartment 70 is composed of an electrically insulative material, which is also chemically inert with respect to the anode and cathode active materials. Likewise, such insulative material is both chemically inert and insoluble with respect to the electrolyte, which is described in greater detail herein. To that end, illustrative embodiments of suitable insulator materials that are substantially impervious to lithium-ion flow are selected from polyethylene, polyethylenechlorotrifluoroethylene, polypropylene, ETFE, and PTFE, and combinations thereof. Suitable insulator material also include thermoplastic fluoropolymer, such as, but not limited to HALAR® or TEFZEL®.

As previously discussed, lithium deposition is induced by high-rate intermittent pulse discharge of a lithium/silver vanadium oxide cell, which can form "lithium clusters" that bridge between the negative casing 12 and the positive connection to the cathode 30 including the cathode tab 40A extending from the current collector 40 connected to the terminal pin 38. This conductive bridge can then result in an internal loading mechanism that could prematurely discharge the cell.

Moreover, as previously described, if the first major face wall of the first clamshell-shaped insulator member described by the '862 patent to Roy et al. is not positioned tightly against the inner surface of the lid 16, there can be a very small gap that could be wide enough for a lithium cluster to form and contact the terminal pin 38. Moreover, since the lid 16 is made of a metal material, for example, titanium and the insulator compartment 70 is made from a polymeric material, it is not always possible to get a tight seal between the metal lid and polymeric insulator compartment.

To help prevent lithium clusters from bridging from the anode to the positive polarity cathode connections including the cathode tab 40A extending from the cathode current collector 40 and connected to the terminal pin 38 in the electrochemical cell 10 shown in FIG. 2 and the cathode tab 40A connected to the cathode manifold 40B connected to the terminal pin 38 in the electrochemical cell 10A shown in FIG. 3, the elastomeric gasket 68 of the present invention residing between the lid 16 and the insulator compartment 70 blocks any gap that might occur as a result of there not being a tight fit between the insulator compartment 70 and the lid 16. The O-ring portion 68A of the elastomeric gasket 68 seals against the inner meniscus 64 of the sealing glass 58 and is continuous with the planar sheet-shaped portion 68B which seals against the inner surface 16B of the lid 16. This construction blocks lithium-ion flow to the covered portions of the inner surface 16b of the lid 16 and to the GTMS 41 including the sealing glass 58.

Further, since the sheet-shaped portion 68B of the elastomeric gasket 68 has a width that extends from the rounded border 42A of the upper side edge portion 42 to the rounded border 44A of the lower side edge portion 44 of the lid 16, and the insulator compartment 70 is fitted into the container contacting the opposed container sidewalls 18, 20, there is no portion of the inside of the container 14 in this area that is not covered. However, the elastomeric gasket 68 and the insulator compartment 70 only extend toward but are spaced from the end walls 22 and 24 of the container 14. Not only does this leave the electrolyte fill port 60 uncovered, which is required to fill the casing 12 with electrolyte, but even though the lid is of a negative polarity in a case-negative cell design, it provides areas on the inner surface 16B on the lid 16 to which lithium clusters can bridge. These uncovered areas are considered to be far enough away from the cathode terminal connections so as to not present a problem with undesirable lithium cluster bridging and subsequent premature discharge the cells 10, 10A.

It should be noted that the electrochemical cells 10, 10A of the present invention, as illustrated in FIGS. 2 and 3, can be of either a rechargeable (secondary) or non-rechargeable (primary) chemistry of a case-negative or case-positive design. The specific geometry and chemistry of the electrochemical cells 10, 10A can be of a wide variety that meets the requirements of a particular primary and/or secondary cell application.

In that respect, a primary electrochemical cell that possesses sufficient energy density and discharge capacity for the rigorous requirements of implantable medical devices comprises a lithium anode or its alloys, for example, Li—Si, Li—Al, Li—B and Li—Si—B. The form of the anode may vary, but preferably it is of a thin sheet or foil pressed or rolled on the metallic anode current collector 36.

The cathode of a primary cell is of an electrically conductive material, preferably a solid material. The solid cathode may comprise a metal element, a metal oxide, a mixed metal oxide, and a metal sulfide, and combinations thereof. A preferred cathode active material is selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof. By way of example, in a case-negative primary electrochemical cell, silver vanadium oxide, as described in U.S. Pat. Nos. 4,310,609 and 4,391,729 to Liang et al., both assigned to the assignee of the present invention and incorporated herein by reference, is a suitable cathode active material.

Before fabrication into a cathode for incorporation into the electrochemical cells 10, 10A, however, the cathode active material is mixed with a binder material such as a powdered fluoro-polymer, more preferably powdered polytetrafluoroethylene or powdered polyvinylidene fluoride (PVDF) present at about 1 to about 5 weight percent of the cathode mixture. Further, up to about 10 weight percent of a conductive diluent is preferably added to the cathode mixture to improve conductivity. Suitable materials for that purpose include acetylene black, carbon black and/or graphite or a metallic powder such as powdered nickel, aluminum, titanium, and stainless steel. The preferred cathode active mixture thus includes a powdered fluoro-polymer binder present at about 3 weight percent, a conductive diluent present at about 3 weight percent, and about 94 weight percent of the cathode active material.

The cathode 34 may be prepared by rolling, spreading, or pressing the cathode active mixture onto a suitable cathode current collector 40. Cathodes prepared as described above are preferably in the form of a strip wound with a corresponding strip of anode material in a structure similar to a "jellyroll" or a flat-folded electrode stack. The prismatic design shown in FIGS. 2 and 3 are also suitable for high-rate pulse discharge applications such as is required by a cardiac defibrillator.

In order to prevent internal short circuit conditions, the cathode 34 is separated from the anode 32 by the separator 30. The separator 30 is preferably made of a fabric woven from fluoropolymeric fibers including polyvinylidine fluoride, polyethylenetetrafluoroethylene, and polyethylenechlorotrifluoroethylene used either alone or laminated with at least one of a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.), and a membrane commercially available under the designation DEXIGLAS (C. H. Dexter, Div., Dexter Corp.).

A primary electrochemical cell includes a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of anode ions to intercalate or react with the cathode active material, and suitable salts include $LiPF_6$, $LiBF_4$, $LiAsF_6$, $LiSbF_6$, $LiClO_4$, $LiO_2$, $LiAlCl_4$, $LiGaCl_4$, $LiC$ $(SO_2CF_3)_3$, $LiN$ $(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Suitable low viscosity solvents include esters, linear and cyclic ethers and dialkyl carbonates such as tetrahydrofuran (THF), methyl acetate (MA), diglyme, triglyme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters, and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell, for example, a lithium/silver vanadium oxide electrochemical cell is 0.8M to 1.5M $LiAsF_6$ or $LiPF_6$ dissolved in a 50:50 mixture, by volume, of PC as the preferred high permittivity solvent and DME as the preferred low viscosity solvent.

In secondary electrochemical systems, the anode 32 comprises a material capable of intercalating and de-intercalating lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless of the form of the carbon, however, fibers of the carbonaceous material are particularly advantageous because they have excellent mechanical properties that permit them to be fabricated into rigid electrodes capable of withstanding degradation during repeated charge/discharge cycling.

The cathode 34 of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt, and manganese. More preferred oxides include $LiNiO_2$, $LiMn_2O_4$, $LiCoO_2$, $LiCo_{0.92}Sn_{0.08}O_2$, $LiCo_{1-x}NixO_2$, $LiFePO_4$, $LiNi_xMn_y$ $Co_{1-x-y}O_2$, and $LiNi_xCo_yAl_{1-x-y}O_2$.

The lithiated active material is preferably mixed with a conductive additive selected from acetylene black, carbon black, graphite, and powdered metals of nickel, aluminum, titanium, and stainless steel. The cathode further comprises a fluoro-resin binder, preferably in a powder form, such as PTFE, PVDF, ETFE, polyamides and polyimides, and mixtures thereof.

The respective current collectors 36, 40 are selected from stainless steel, titanium, tantalum, platinum, gold, aluminum, cobalt nickel alloys, highly alloyed ferritic stainless steel containing molybdenum and chromium, and nickel-, chromium- and molybdenum-containing alloys.

Suitable secondary electrochemical systems are comprised of nonaqueous electrolytes of an inorganic salt dissolved in a nonaqueous solvent and more preferably a lithium salt dissolved in a quaternary mixture of organic carbonate solvents. Suitable organic carbonate solvents comprise dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC), and ethyl propyl carbonate (EPC), and mixtures thereof, and at least one cyclic carbonate selected from propylene carbonate (PC), ethylene carbonate (EC), butylene carbonate (BC), and vinylene carbonate (VC), and mixtures thereof. Organic carbonates are generally used in the electrolyte solvent system for such electrochemical cell chemistries because they exhibit high oxidative stability toward cathode materials and good kinetic stability toward anode materials.

The electrochemical cells 10, 10A, whether of a primary or a secondary chemistry, are thereafter filled with the electrolyte described hereinabove and hermetically sealed such as by close-welding a titanium plug 62 into the fill port 60, but not limited thereto.

It is appreciated that various modifications to the inventive concepts described herein may be apparent to those skilled in the art without departing from the spirit and scope of the present invention as defined by the hereinafter appended claims.

What is claimed is:

1. An electrochemical cell, comprising:
   a) a casing comprising:
      i) a container having a sidewall extending from a closed bottom wall to an open end; and
      ii) a lid closing the open end of the container, wherein the lid has inner and outer lid surfaces extending to a peripheral edge, and wherein the lid has a terminal pin opening and an electrolyte fill port; and
   b) a terminal pin extending through the terminal pin opening;
   c) a glass-to-metal seal (GTMS) comprises a sealing glass that electrically isolates the terminal pin from the lid so that the terminal pin is in a non-conductive relation with the casing;
   d) an elastomeric gasket comprising a distal gasket surface spaced from a proximal gasket surface, wherein the distal gasket surface is sealed to the inner surface of the lid;
   e) an electrode assembly housed inside the casing, the electrode assembly comprising:
      i) an anode comprising an anode active material supported on an anode current collector, wherein the anode current collector comprises at least one anode lead conductively connected to the casing;
      ii) a cathode comprising a cathode active material supported on a cathode current collector, wherein the cathode current collector comprises at least one cathode tab extending outwardly beyond a perimeter edge of the cathode current collector, the perimeter edge from which the at least one cathode tab extends being spaced closer to the lid than a remainder of the cathode current collector; and
      iii) at least one separator positioned between the anode and the cathode to prevent direct physical contact between them; and
   f) an insulator compartment, comprising:
      i) a first insulator member having a first surrounding sidewall extending from a first insulator face wall to a first sidewall outer edge, wherein the first insulator face wall contacts the proximal gasket surface of the elastomeric gasket sealed to the inner surface of the lid with the first surrounding sidewall extending away from the lid toward the upper edge of the electrode assembly, and wherein the terminal pin extends through the elastomeric gasket and through a first opening in the first insulator face wall; and ii) a second insulator member having a second surrounding sidewall extending from a second insulator face wall to a second sidewall outer edge, the second insulator face wall being disposed adjacent to the perimeter edge of the cathode current collector with the second surrounding sidewall extending away from the perimeter edge of the cathode current collector toward the lid, wherein the cathode tab extends through a second opening in the second insulator face wall, iii) wherein the first and second insulator members are mated to each other with one of the first and second outer edges of the first and second surrounding sidewalls facing the other of the first and second insulator face walls so that at least a portion of the first surrounding sidewall is in an overlapping, direct contact relationship with at least a portion of the second surrounding sidewall to thereby form the insulator compartment residing between the perimeter edge of the cathode current collector and the elastomeric gasket sealed to the inner surface of the lid, and iv) wherein the terminal pin is connected to the cathode tab in the insulator compartment; and g) an electrolyte provided in the casing to activate the electrode assembly.

2. The electrochemical cell of claim 1, wherein the elastomeric gasket comprises an O-ring gasket portion that contacts the sealing glass of the GTMS and a sheet-shaped gasket portion that is connected to the O-ring gasket portion and sealed to the inner surface of the lid.

3. The electrochemical cell of claim 2, wherein the O-ring gasket portion and the sheet-shaped gasket portion of the elastomeric gasket are connected together as a unitary elastomeric gasket.

4. The electrochemical cell of claim 2, wherein the sealing glass of the GTMS has an inner meniscus that is recessed distally from the inner surface of the lid with the O-ring gasket portion of the elastomeric gasket contacting the inner meniscus.

5. The electrochemical cell of claim 2, wherein the peripheral edge of the lid comprises spaced apart upper and lower side edge portions that meet with right and left end edge portions, and wherein the sheet-shaped gasket portion of the elastomeric gasket extends to the lid upper and lower side edge portions but is spaced from the right and left end edge portions of the lid to provide uncovered portions of the inner lid surface that extend from an outer edge of the elastomeric gasket to an inner surface of the container sidewall, and wherein the uncovered portions of the inner lid surface are where lithium clusters can contact the lid without bridging to the at least one cathode current tab connected to the terminal pin.

6. The electrochemical cell of claim 1, wherein the lid does not have a ferrule so that the sealing glass of the GTMS seals directly to the terminal pin and directly to the lid in the terminal pin opening.

7. The electrochemical cell of claim 1, wherein the electrode assembly further comprises at least two cathode plates, each cathode plate having a cathode tab conductively connected to the terminal pin inside the insulator compartment, and wherein at least a portion of the anode resides between the at least two cathode plates.

8. The electrochemical cell of claim 7, wherein the anode has a serpentine shape with one of the at least two cathode plates interleaved between a fold of the serpentine anode, and wherein each of the at least two cathode plates has a cathode tab housed inside the insulator compartment where the cathode tabs are conductively connected to a cathode bridge, and wherein the cathode bridge is conductively connected to the terminal pin in the insulator compartment.

9. The electrochemical cell of claim 7, wherein the second opening in the second insulator face wall of the second insulator member is configured to receive the cathode tabs comprising the at least two cathodes connected to the cathode bridge.

10. The electrochemical cell of claim 1, wherein the first and second insulator members of the insulator compartment are composed of a material that is impervious to lithium-ion flow therethrough and which is selected from polyethylene, polyethylenechlorotrifluoroethylene, polypropylene, ETFE, and PTFE, and combinations thereof.

11. The electrochemical cell of claim 1, wherein the cathode active material is selected from silver vanadium oxide, $CF_x$, SVO/current collector/$CF_x$, copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, $Ag_2O$, $Ag_2O_2$, $CuF_2$, $Ag_2CrO_4$, copper oxide, and copper vanadium oxide, and mixtures thereof.

12. An electrochemical cell, comprising:

a) a casing comprising:

i) a container having a sidewall extending from a closed bottom wall to an open end; and ii) a lid closing the open end of the container, wherein the lid has inner and outer lid surfaces extending to a peripheral edge, and wherein the lid has a terminal pin opening and an electrolyte fill port, and wherein the lid does not have a ferrule; and b) a terminal pin extending through the terminal pin opening in the lid with a sealing glass directly contacting the terminal pin and the lid at the terminal pin opening so that the terminal pin is in a non-conductive relation with the casing;

c) an elastomeric gasket comprising an O-ring gasket portion that contacts the sealing glass and a sheet-shaped gasket portion that is connected to the O-ring gasket portion and sealed to the inner surface of the lid;

d) an electrode assembly housed inside the casing, the electrode assembly comprising:

i) an anode comprising lithium supported on an anode current collector, wherein the anode current collector comprises at least one anode lead conductively connected to the casing;

ii) a cathode comprising a cathode current collector comprising opposed major surfaces, wherein silver vanadium oxide and $CF_x$ are contacted to the opposed major surfaces of the cathode current collector, and wherein the cathode current collector comprises a cathode tab extending outwardly beyond a perimeter edge of the cathode current collector; and iii) at least one separator positioned between the anode and the cathode to prevent direct physical contact between them; and e) an insulator compartment, comprising:

i) a first insulator member having a first surrounding sidewall extending from a first insulator face wall to a first sidewall outer edge, wherein the first insulator face wall contacts the elastomeric gasket sealed to the inner surface of the lid with the first surrounding sidewall extending away from the lid toward the upper edge of the electrode assembly, and wherein the terminal pin extends through the O-ring gasket portion of the elastomeric gasket and through a first opening in the first insulator face wall; and ii) a second insulator member having a second surrounding sidewall extending from a second insulator face wall to a second sidewall outer edge, the second insulator face wall being disposed adjacent to the perimeter edge of the cathode current collector with the second surrounding sidewall extending away from the perimeter edge of the cathode current collector toward the lid, wherein the cathode tab extends through a second opening in the second insulator face wall, iii) wherein the first and second insulator members are mated to each other with one of the first and second outer edges of the first and second surrounding sidewalls facing the other of the first and second insulator face walls so that at least a portion of the first surrounding sidewall is in an overlapping, direct contact relationship with at least a portion of the second surrounding sidewall to thereby form the insulator compartment residing between the perimeter edge of the cathode current collector and the elastomeric gasket sealed to the inner surface of the lid, and iv) wherein the terminal pin is connected to the cathode tab in the insulator compartment; and f) an electrolyte provided in the casing to activate the electrode assembly.

13. The electrochemical cell of claim 12, wherein the O-ring gasket portion and the sheet-shaped gasket portion of the elastomeric gasket are connected together as a unitary elastomeric gasket.

14. The electrochemical cell of claim 12, wherein the sealing glass has an inner meniscus that is recessed distally from the inner surface of the lid with the O-ring gasket portion of the elastomeric gasket contacting the inner meniscus.

15. The electrochemical cell of claim 12, wherein the peripheral edge of the lid comprises spaced apart upper and lower side edge portions that meet with right and left end edge portions, and wherein the sheet-shaped gasket portion of the elastomeric gasket extends to the upper and lower side edge portions but is spaced from the right and left end edge portions of the lid to provide uncovered portions of the inner lid surface that extend from an outer edge of the elastomeric gasket to an inner surface of the container sidewall, and wherein the uncovered portions of the inner lid surface are where lithium clusters can contact the lid without bridging to the at least one cathode current tab connected to the terminal pin.

16. The electrochemical cell of claim 12, wherein the elastomeric gasket has a distal gasket surface spaced from a proximal gasket surface, and wherein the distal gasket surface is sealed to the inner surface of the lid, and the first insulator face wall of the first insulator member of the insulator compartment directly contacts the proximal gasket surface.

17. The electrochemical cell of claim 12, wherein the electrode assembly further comprises at least two cathode plates, each cathode plate having a cathode tab conductively connected to the terminal pin inside the insulator compartment, and wherein at least a portion of the anode resides between the at least two cathode plates.

18. The electrochemical cell of claim 17, wherein the anode has a serpentine shape with one of the at least two cathode plates interleaved between a fold of the serpentine anode, and wherein each of the at least two cathode plates has a cathode tab housed inside the insulator compartment where the cathode tabs are conductively connected to a cathode bridge, and wherein the cathode bridge is conductively connected to the terminal pin in the insulator compartment.

* * * * *